Patented Jan. 3, 1950

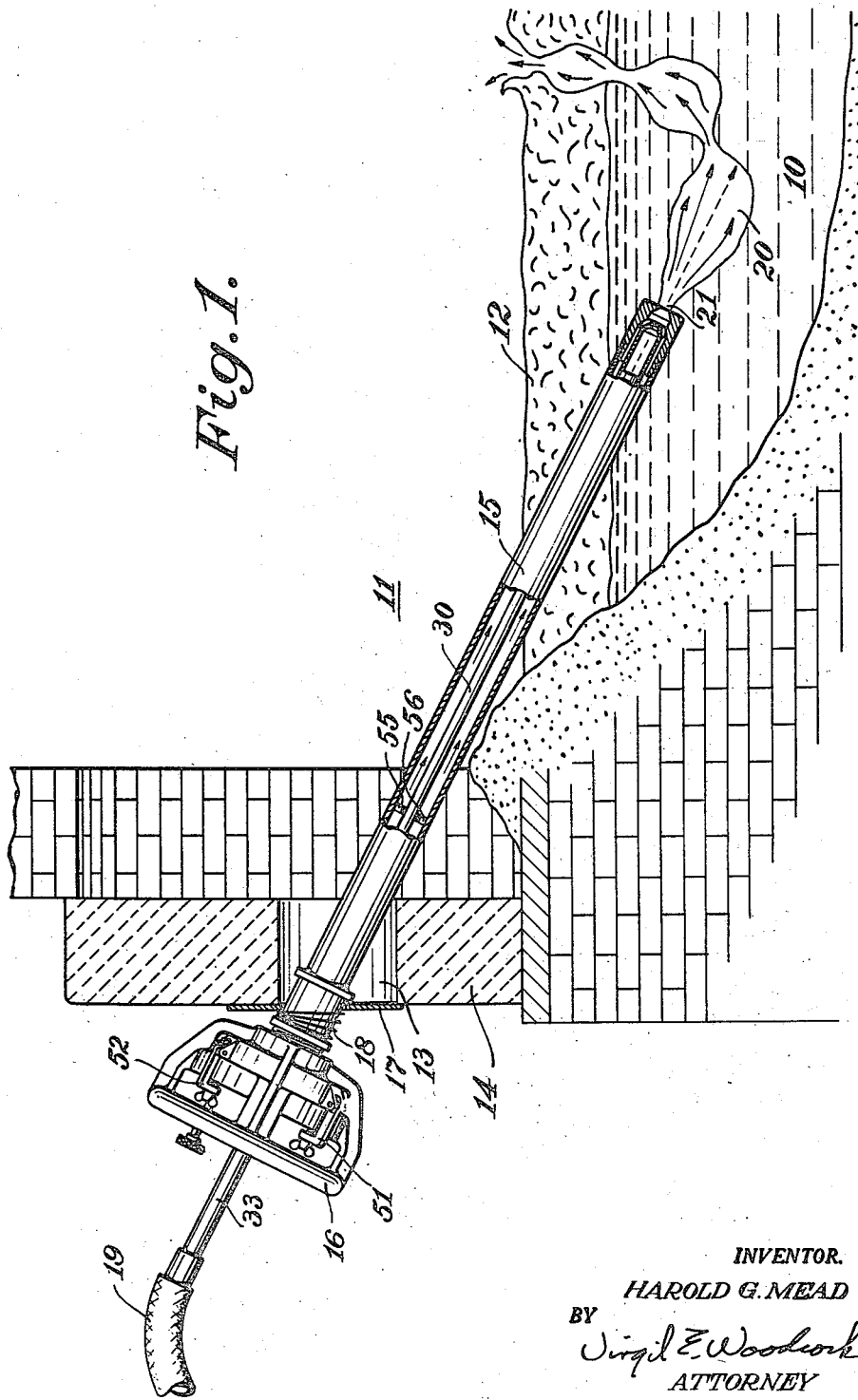

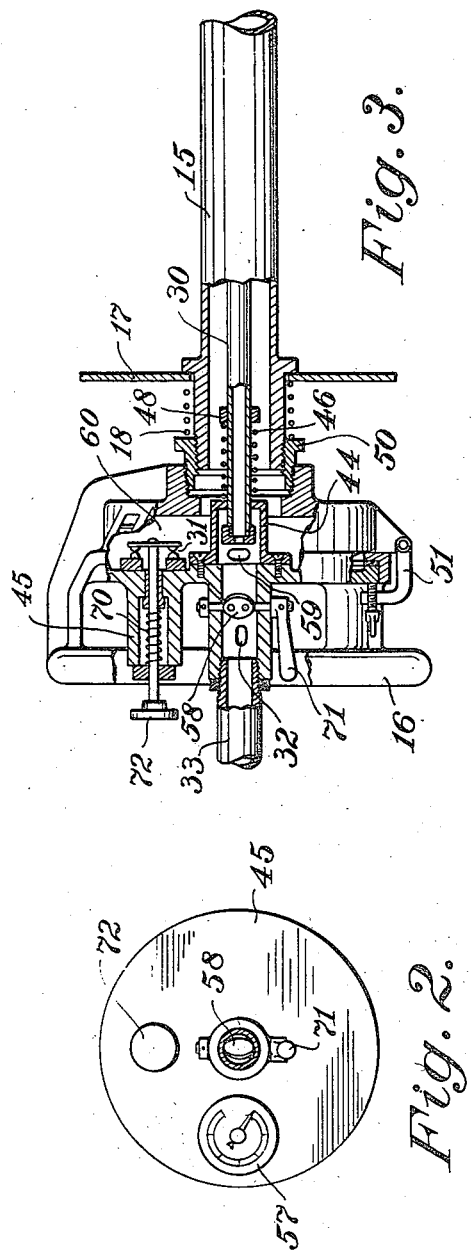

2,493,078

UNITED STATES PATENT OFFICE 2,493,078

IMMERSION UNIT FOR RADIATION PYROMETERS

Harold G. Mead, Bronxville, N. Y., assignor to Leeds and Northrup Company, Philadelphia, Pa., a corporation of Pennsylvania Application August 20, 1945, Serial No. 611,515

5 Claims. (Cl. 136—4)

1

This invention relates to apparatus for measuring high temperatures, particularly temperatures of molten metal, such as produced in an open hearth or similar furnaces utilized in refining a charge.

It has long been known that metallurgical reactions during the refining of metals are substantially affected by temperature. In open hearth furnaces the temperature of the metal during refining ranks in importance with other objectives, such as the composition of the metal, the characteristics of the slag, and the like. Moreover if at the time of tapping the metal is too cool, "skulls" will form in the ladle while if the metal is too hot, the ladle linings and other handling equipment will be damaged. Moreover, if the temperature is too high, the metal will stick in the ingot molds interfering with its subsequent removal.

Heretofore, efforts have been made to measure the molten steel temperatures of the bath by the "spoon" test or the "rod" test, neither of which is conclusive or definite because each requires the personal judgment of the operator and, of course, this differs with each operator.

Measurement of the temperature during tapping has usually been made with optical pyrometers sighted on the tapping stream, but such measurements come too late either to correct the temperatures during refining or to provide the correct temperature for tapping. Furthermore, optical readings vary a great deal because of difference in practice between observers, the presence of smoke and variations in metallurgical conditions which directly affect the emissivity corrections to be applied to the pyrometer.

It has heretofore been proposed to determine the temperature of the metal in the bath by submerging an open-ended tube in the bath, providing a radiation responsive device at the closed end of the tube and forcing air through the tube and out its open end so that the radiation responsive device may be directly affected by the temperature of the molten metal. In arrangements of this type a relatively long tube is required. Even with lenses located in the long tube for directing the radiation on the remotely positioned pyrometer, any warpage of the tube changes the proportion of the radiation received by the pyrometer, thus, introducing errors into the readings. It has been impossible to prevent warpage of the tube because of the high temperatures to which it is subjected. Various schemes have been tried out in an endeavor to collect all

2 radiation received within the tube and to transmit it to the pyrometer, but none of these proposals has proved satisfactory.

In carrying out the present invention in one form thereof, there is provided means for so locating and supporting the pyrometer within a tube at a point sufficiently near the open end, which is immersed in the molten bath, that the pyrometer always receives radiation directly from the bath notwithstanding warpage of the enclosing tube. The supporting means itself includes two cooperating bearing surfaces immediately adjacent the open end of the tube. One bearing surface is carried by the tube and the other bearing surface supports the pyrometer. Resilient means are provided for maintaining the bearing surface in continuous contact during relative movement caused by bending or warping of the supporting tube.

For a more complete understanding of the invention and for further objects and advantages thereof, reference should be had to the following description taken in conjunction with accompanying drawings in which:

Fig. 1 is a vertical cross-section through a fractional part of an open hearth furnace showing the invention applied to the measurement of the temperature of the metal bath;

Fig. 2 is an end view, partly in section, of the device shown in Fig. 1, with the handle or supporting ring omitted;

Fig. 3 is a side elevation, partly in section, of one end of the device of Fig. 1 with the lead wires omitted; and Fig. 4 is a side elevation, partly in section, of the other end of the device of Fig. 2 with the lead wires omitted.

Referring to the drawings, the invention in one form has been shown applied to the measurement of the temperature of a metal bath 10 contained within an open hearth furnace 11. It will be observed that the molten bath 10 is covered by a relatively thick surface layer 12 of slag. Accordingly, if a radiation pyrometer were to be directed through the wicket hole 13 of the door 14 upon the slag 12, it would receive radiation from the slag rather than from the metal bath 10 whose temperature is of importance. In accordance with the invention there is provided a total radiation pyrometer disposed within and adjacent the lower end of an enclosing tube 15 which is designed for temporary immersion within the bath 10. The tube 15 is introduced through the wicket hole 13 and is supported in the position illustrated in Fig. 1 by means of a circular handle or wheel 16 which is attached to the upper end of the tube 15. A plate 17 is biased by a spring 18 to close the wicket hole 13 so as to protect the operator from sparks, hot gases and/or flame.

Air under pressure is introduced by way of a flexible supply hose 19. The air is under pressure adequate to maintain the flow thereof outwardly through the open end 21 of the tube 15 and through the metal bath 10 and its covering slag 12. As shown, the air moving out from the open end of the tube 15 forms a cavity 20 adjacent the end thereof. It has been found that the metal surface of the cavity 20 changes so rapidly that its temperature is not lowered by the incoming air. The air is admitted at such a rate that it neither cools the surface of the cavity nor does it produce a higher temperature by "Bessemer" action. The cavity 20 comprises a substantially closed chamber with consequent production of substantially "black body" conditions. Radiation from the cavity 20 is transmitted through the opening 21 of the tube 15.

As best shown in Fig. 4, it will be observed that the tube 15 is provided at its open end with a tubular member 15a of somewhat greater cross-section which has a thickened end terminating at the opening 21. A greater part of the radiation transmitted through the opening 21 is transmitted through an opening 22, of smaller area or diameter, formed in the end piece 23 of an inner tubular assembly which supports the radiation pyrometer. Radiation transmitted through the opening 22 passes through a cover glass or window 24, a lens 25, a second lens 26, an opening 27 and on to the radiation receiver 28 of the radiation pyrometer. The radiation receiver may be of the type shown in Fig. 2a of U. S. Letters Patent 2,232,594 in which a plurality of thermocouples are supported by clamping rings with their hot junctions in intimate thermal relation to a common target. The radiation receiver is connected by leads, not shown, to a pair of binding posts, one of which, the binding post 29, is shown in Fig. 4. Lead wires, not shown, extend through a tube 30. From the end of the tube 30, Fig. 3, they lead to a switch 31 and thence outwardly through an opening 32 for passage through a pipe 33 to which the flexible hose 19, Fig. 1, is attached. Switch 31 is preferably a shorting switch connected in parallel to or across the leads. These wires or leads have been omitted from the drawings in the interest of clarity. It is sufficient to say they are provided to connect the radiation receiver or radiation-responsive device 28 to a measuring apparatus such as a recorder, of conventional design, which forms no part of the present invention.

The inner tubular structure or assembly is supported at one end, Fig. 4, by a spherical bearing surface 35 of member 15a engaged by three fins formed integrally with the tube 23 and two of which, the fins 36 and 37, are shown in Fig. 4. The fins are also provided with curved surfaces complementary to the surface 35. Thus, the curved surfaces of the fins form a means for centering the member 23 within the member 15a. The fins are made relatively thin so as to minimize conduction of heat therethrough. The tubular member 23 is threadedly connected to a coupling member 38 which in turn is threaded to a tube 39. The inner assembly including the radiation receiver is supported from an insulating block 40 having a flange which engages the opposite end of the tube 39. A tubular member 41 has a shoulder which engages flange 42 which in turn presses against the insulating member 40. Thus, the coupling member 41 by threadedly engaging the end of the tube 39 provides a rigid assembly which includes the supports of the radiation receiver. The coupling member 43 has threadedly connected to it one end of the pipe 30. The opposite end of the pipe 30, Fig. 3, is slidably supported within a tubular member 44 which is attached to a body member 45. A spring 46 encircling the end of the tube 30 has one end bearing against the tubular member 44 while the opposite end thereof bears against a collar 48 rigidly secured to the tube 30. The spring 46 is effective in pressing the tube 30 away from the tubular member 44 and resiliently to maintain the fins, as 36 and 37, against the bearing surface 35. The outer tube 15 is threadedly connected to the supporting wheel 16, Fig. 3, by means of an intermediate bushing 50. The body member 45 is clamped within the supporting wheel 16 by means of clamping members, two of which, the members 51 and 52, are shown in Figs. 1 and 3.

In the assembled position, as illustrated, the spring 46 is at all times effective to press the fins, as the fins 36 and 37, Fig. 4, against the bearing surface 35. Accordingly, any warpage or distortion or bending of the outer tube 15 occasioned by non-uniform heating thereof will not affect the alignment of the opening 22 with respect to the opening 21 because of the centering action of aforesaid bearing surfaces. As already stated, the bearing surface 35 is preferably spherical and the fins have a radius of curvature equal to that of surface 35. The result is that the opening 22 is maintained in a coaxial position with respect to the opening 21. It will be remembered, the opening 22 is of slightly less area than the opening 21 so that an additional factor of safety is provided should the opening 22 be displaced from its concentric position with respect to the opening 21. During the most severe operating conditions, the opening 22 has been maintained in alignment with the opening 21 for transmission of radiation unmasked by any part of the walls around the opening 21. The radiation pyrometer therefore responds to the total radiation from the "black body" cavity 20 and provides accurate and reliable measurement of the temperature of the metal of the bath which forms the wall of the cavity 20.

Though the surface 35 has been shown as spherical surface, it may take other forms. For example, it may be formed by a tubular circular opening. The essential requirement is that the surfaces of the three fins, as fins 36 and 37, shall be such as to maintain the centering action.

For additional support of the tube 30 there may be provided, Fig. 4, bosses or projections secured to the tube 30 and whose ends slidably engage the inner wall of the tube 15. Preferably three bosses are provided for each location, two of them, the bosses 53 and 54, being shown in Fig. 4 and two of them, the bosses 55 and 56, being shown in Fig. 1.

It will be recalled that air under substantial pressure, of the order of twenty pounds per square inch, gage, as indicated by a pressure gage 57 is supplied to, and flows through, the flexible hose 19, the pipe 33, Fig. 3, and thence past a butterfly valve 58, through a port 59 and into a chamber 60 formed in the body member 45. The chamber 60 communicates with the open end of the tube 15 through an annular port formed around member 44. The air then flows around the outside of the tube 30 and around the radiation pyrometer housing and outwardly through the opening 21. Its path through the molten metal has been illustrated by the cavities and arrows of Fig. 1.

In order to minimize transfer of heat to the pyrometer due to the temperature of the wall of the tube 15, the pyrometer housing, including the tube 39, is provided with an intermediate tube 62 supported on hubs formed at the respective ends of the tube 39. The tube 62 is provided with a number of outwardly extending fingers or air-scoops, two of which, the fingers 63 and 64, are shown in Fig. 4. These serve the purpose of collecting air from the stream and directing it through the angular space provided between the walls of the tubes 39 and 62. A number of outlet openings are provided in the outer tube 62, two of which, the openings 66 and 67, are shown in Fig. 4. Because of the described arrangement, transfer of heat from the wall 15 to the radiation receiver is minimized. Any transfer of heat therefrom must be by radiation across the air-gap between the wall of the tube 15 and the wall of the tube 62, and thence by radiation across the air-gap between the walls of the tubes 39 and 62. Because of the rapidly flowing streams of relatively cool air, there will be little, if any, transfer of heat by convection. Any transfer by radiation will tend to elevate the temperature of the tube 62. However, this tube is cooled and maintained at relatively low temperature by the streams of air on both sides thereof. Its temperature is maintained below that required for substantial radiation of heat to the tube 39.

In operation of the invention, the assembly, as a whole, will be brought to a convenient location adjacent the door 14 of the open hearth furnace 11. During this time the butterfly valve 58 will be in the closed position to reduce the flow of air to a substantial degree. The butterfly valve 58 is provided to conserve air under pressure prior to insertion of assembly into the furnace 11.

It will be observed the switch 31 is biased by a spring 70 to the closed position. In this position the radiation pyrometer is short-circuited so that the associated recording equipment will not be affected by radiation received during the insertion of the assembly into the metal bath.

The operator moves the open end of the tube 15 through the wicket hole 13. The ring or handle 16 provides him with a convenient means for directing the tube 15 downwardly and into the metal bath 10. At the time the end of the tube 15 is introduced into the wicket, the handle 71 is operated to open the butterfly valve 58 for maximum flow of air. The operator's hands are protected by means of the shield 17 which, through the spring 18, is maintained against the walls surrounding the opening of the wicket hole 13. After the tube 15 has been moved to a position corresponding with that shown in Fig. 1, there will be transmitted to the radiation pyrometer radiation from the "black body" cavity 20. The operator after a second or two then presses the knob 72 to open the switch 31 thereby to connect the radiation receiver of the pyrometer to the measuring and recording apparatus, not shown. This recording mechanism, which may be of the type shown in Williams Patent No. 2,113,164, functions to record the output from the pyrometer in a very short interval of time. In consequence, the operator maintains the end of the tube immersed in the metal bath for four or five seconds whereon he releases the knob 72 for closure of the switch 31 again to short-circuit the output of the radiation receiver of the pyrometer. The operator then withdraws the assembly as a whole from the open hearth furnace 11. After the open end of the tube 15 has cooled somewhat, he may then close the butterfly valve 58, leaving a certain amount of air flowing through the assembly for continued cooling thereof. Switch 31 is preferably of the shorting type to insure minimum change of circuit impedance upon insertion or removal of the pyrometer voltage.

It has been found that a measuring device of the character described has a relatively long life notwithstanding the severe operating conditions under which it must function. More importantly, there has been provided a means for accurately measuring the temperature of the metal bath 10, the result of which is that a greater uniformity may be attained in the character of the steel produced by the furnace. Variables due to personal judgment of the operator have been eliminated and the practice in one plant may be compared with the practice in other plants, whereas in the past, due to the personal judgment involved, precise knowledge as to the temperatures of the metal bath has been lacking.

While a preferred embodiment of the invention has been described and illustrated, it is to be understood that modifications may be made within the spirit and scope of the appended claims.

What is claimed is:

1. In a radiation pyrometer system for measuring the temperature of molten metals, the combination of an outer tubular member having an open end immersed in the molten metal during measurement of the temperature thereof, said member adjacent its open end having an internal bearing surface, an inner tubular assembly including a radiation responsive device, said assembly including three relatively narrow bearing members secured in symmetrical relation about one end of said inner assembly, said bearing member having curved centering surfaces which in cooperation with said bearing surface of said outer tubular member maintain said one end of said inner assembly centered with respect to said open end of said outer member, means for slidably supporting the opposite end of said inner assembly, and means for biasing said bearing surfaces one against the other to maintain said inner assembly centered within said open end to insure said radiation-responsive device views only the molten metal through said open end despite any distortion of said outer member.

2. In a radiation pyrometer system for measuring the temperature of molten metal, the combination of an outer tubular member having an open end to be immersed in the molten metal during measurement of the temperature thereof, said member adjacent its open end having a spherical internal bearing surface, an inner tubular member slidably supported within said outer tubular member and having an open end with an external bearing surface complementary to said first-named spherical bearing surface, a radiation-responsive device supported within said inner tubular member remote from open end thereof to view molten metal through said open ends of said members, and resilient means for biasing said spherical bearing surfaces one against the other to maintain said openings in coaxial alignment with said responsive device despite distortion of said outer tubular member.

3. In a radiation pyrometer system for measuring the temperature of molten metal, the combination of an outer tubular member terminating in a thickened end with a passage converging to an opening for viewing of the molten metal, said passage at its inner end being shaped to provide a spherical bearing surface, an inner tubular member slidably supported within said outer tubular member having an end shaped to provide a bearing surface complementary to said first-named spherical bearing surface and with an opening of area smaller than said first-named opening, a radiation-responsive device supported within said inner tubular member remote from said end thereof to view the molten metal through said opening, and resilient means for biasing said spherical bearing surfaces one against the other to insure continued viewing of the metal by said device despite distortion of said outer tubular member.

4. In a radiation pyrometer system for measuring the temperature of molten metal, the combination of an outer tubular member having an open end to be immersed in the molten metal during measurement of the temperature thereof, said member adjacent its open end having an internal spherical bearing surface, an inner tubular member spaced within said outer tubular member to provide a passage for cooling gas and having an open end with fins spaced for discharge of the gas through the said open end of said outer tubular member, said fins being shaped to provide a bearing surface complementary to said first-named spherical bearing surface, a radiation-responsive device mounted in said inner tubular member remote from said open end thereof to view molten metal through said open ends of said members, and means for maintaining said openings in coaxial alignment with said device despite distortion of said outer tubular member comprising structure for slidably supporting said inner tubular member remotely from its said open end, and resilient means for biasing said spherical bearing surfaces one against the other.

5. The combination as defined in claim 4 in which the assembly comprising the inner tubular member and responsive device includes a third tubular member which is spaced about said inner tubular member to form a second passage with inlet and outlet openings respectively in advance of and beyond said responsive device and which is provided with outwardly flared vanes for diverting gas from the said first passage through said inlet openings.

HAROLD G. MEAD.

REFERENCES CITED

The following references are of record in the file of this patent:

UNITED STATES PATENTS

| Number | Name | Date |
| --- | --- | --- |
| 2,054,382 | Larsen et al. | Sept. 15, 1936 |
| 2,184,169 | Sordahl | Dec. 19, 1939 |
| 2,232,594 | Dike | Feb. 18, 1941 |
| 2,266,416 | Duclos | Dec. 16, 1941 |
| 2,343,242 | Richmond | Mar. 7, 1944 |
| 2,366,285 | Percy et al. | Jan. 2, 1945 |
| 2,390,578 | Findley | Dec. 11, 1945 |

OTHER REFERENCES

Head, V. P.: Trans. A. S. M. E., vol. 66 (1944), p. 266.

Clark et al.: Metals Technology T. P. 2031, June 1946, pp. 1–12.